United States Patent
Ho et al.

(10) Patent No.: US 9,688,026 B2
(45) Date of Patent: Jun. 27, 2017

(54) HEATING PLATFORM AND 3D PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Kwan Ho, New Taipei (TW); Chih-Ming Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 655 days.

(21) Appl. No.: 14/178,275

(22) Filed: Feb. 12, 2014

(65) Prior Publication Data
US 2015/0165687 A1   Jun. 18, 2015

(30) Foreign Application Priority Data
Dec. 12, 2013 (TW) .............................. 102223491 U

(51) Int. Cl.
*B29C 67/00* (2017.01)
*H05B 3/22* (2006.01)
*H05B 1/02* (2006.01)

(52) U.S. Cl.
CPC ...... *B29C 67/0088* (2013.01); *B29C 67/0055* (2013.01); *B29C 67/0092* (2013.01); *H05B 1/023* (2013.01); *H05B 3/22* (2013.01)

(58) Field of Classification Search
CPC . B29C 67/0088; B29C 67/0055; H05B 1/023; H05B 3/22; B20C 67/0092
USPC ................................ 264/401; 425/174.4, 375
See application file for complete search history.

(56) References Cited

U.S. PATENT DOCUMENTS

| 7,604,768 | B2 * | 10/2009 | Kritchman | ............. | B29C 41/02 264/308 |
| 8,905,742 | B2 * | 12/2014 | Knighton | ............. | B29C 47/0866 264/308 |
| 2006/0116391 | A1 * | 6/2006 | Horbury | ............. | C07D 239/42 514/275 |
| 2006/0118983 | A1 * | 6/2006 | Cochran | ............. | B29B 13/023 264/40.6 |

(Continued)

*Primary Examiner* — Nahida Sultana
(74) *Attorney, Agent, or Firm* — Jianq Chyun IP Office

(57) ABSTRACT

A heating platform including a substrate, a heating plate, a conducting plate and a temperature sensing element is provided. The substrate has a first surface for forming a three dimensional (3D) object and an opposite second surface. The heating plate is attached to the second surface of the substrate to heat the substrate. The conducting plate is attached to the heating plate, and the heating plate is coved between the substrate and the conducting plate, wherein the area of the conducting plate is smaller than the area of the substrate, and an end of the conducting plate extends to the outer of the heating plate. The temperature sensing element is disposed at the end of the conducting plate extending to the outer of the heating plate to sense the temperature of the substrate through the conducting plate. A 3D printing apparatus including the heating platform aforementioned is also provided.

14 Claims, 2 Drawing Sheets

(56) References Cited

U.S. PATENT DOCUMENTS

| | | | | |
|---|---|---|---|---|
| 2012/0195994 | A1* | 8/2012 | El-Siblani | B29C 67/007 425/174.4 |
| 2014/0265034 | A1* | 9/2014 | Dudley | B29C 67/0085 264/401 |
| 2015/0077215 | A1* | 3/2015 | Ranky | B29C 70/88 338/47 |
| 2015/0140150 | A1* | 5/2015 | Schmehl | B33Y 10/00 425/150 |
| 2015/0231831 | A1* | 8/2015 | El-Siblani | B29C 67/0066 264/401 |
| 2015/0367415 | A1* | 12/2015 | Buller | B23K 26/346 419/53 |
| 2016/0185039 | A1* | 6/2016 | Carbone | B29C 67/0055 425/375 |
| 2016/0200052 | A1* | 7/2016 | Moore | B29C 67/0092 264/401 |

* cited by examiner

HEATING PLATFORM AND 3D PRINTING APPARATUS

CROSS-REFERENCE TO RELATED APPLICATION

This application claims the priority benefit of Taiwan application serial no. 102223491, filed on Dec. 12, 2013. The entirety of the above-mentioned patent application is hereby incorporated by reference herein and made a part of this specification.

BACKGROUND

Field of the Invention

The invention is directed to a heating platform and a printing apparatus and more particularly, to a heating platform and a 3D printing apparatus applying the heating platform.

Description of Related Art

Along with the progress in computer-aided manufacturing (CAM), manufacturers have developed the three-dimensional (3D) printing technology to rapidly fabricate an original design concept. The 3D printing technology is by meaning a collective term referring to a series of rapid prototyping (RP) techniques, and the basic principle is additive manufacturing, where a RP machine is used to form cross-sectional shapes of a workpiece in an X-Y plane through scanning, shift intermittently at a layer thickness in the Z coordinates, and ultimately form 3D objects. The 3D printing technology is applicable regardless of the geometric shapes, and the RP technology produces excellent outputs in particular for complex parts, which significantly saves efforts and processing time. The 3D printing technology is capable of presenting an object of a digital 3D model designed by means of computer-aided design (CAD) software in less time for a user to touch and actually feel the geometry of the model, or even to test the assembling capability of the parts and possible functions.

Taking a 3D printing apparatus utilizing a fused deposition modeling (FDM (method) for example, a thermal-plastic material is heated and melted, and then coated in a layer-by-layer manner on a substrate of the 3D printing apparatus, such that a 3D object is formed in the layer-by-layer manner after the thermal-plastic material is cooled, cured and dispensed. The substrate of such type of 3D printing apparatus has to be continuously heated during the manufacturing process of the 3D object to maintain a temperature of the substrate as being higher than a curing temperature of the thermal-plastic material so as to prevent the thermal-plastic material from being cooled too soon and cured. Additionally, the temperature of the substrate may be sensed by a temperature sensing element, such that a control unit can control the temperature of the substrate according to a sensing result of the temperature sensing element. Nevertheless, when the substrate is manufactured as having a larger area, temperature unevenness occurs easily on surfaces of the substrate, for example, the central portion of the substrate has a higher temperature, while the peripheral portion of the substrate has a lower temperature. Therefore, if the temperature sensing element adjusts the temperature of the substrate only according to the temperature in part of the substrate, the central portion of the substrate may be probably overheated, which cause the 3D object to be burnt, or the peripheral portion of the substrate may probably be excessively cold, which causes the 3D object to be unexpectedly cured.

SUMMARY

The invention provides a heating platform having good heating effects.

The invention provides a three dimensional (3D) printing apparatus having good printing effects.

The invention is directed to a heating platform adapted to form a 3D object in a layer-by-layer manner by dispensing a thermal-plastic material. The heating platform includes a substrate, a heating plate, a conducting plate and a temperature sensing element. The substrate has a first surface and a second surface which are opposite to each other, and the first surface is used to form the 3D object. The heating plate is attached to the second surface of the substrate to heat the substrate. The conducting plate is attached to the heating plate, such that the heating plate is coved between the second surface of the substrate and the conducting plate. A surface area of the conducting plate is smaller than a surface area of the substrate, and an end of the conducting plate extends out of the heating plate. The temperature sensing element is disposed on the end of the conducting plate which extends out of the heating plate to sense a temperature of the substrate through the conducting plate.

The invention is directed to a 3D printing apparatus adapted to form a 3D object in a layer-by-layer manner by dispensing a thermal-plastic material. The 3D printing apparatus includes a heating platform and a printing unit. The heating platform includes a substrate, a heating plate, a conducting plate and a temperature sensing element. The substrate has a first surface and a second surface which are opposite to each other, and the first surface is used to form the 3D object. The heating plate is attached to the second surface of the substrate to heat the substrate. The conducting plate is attached to the heating plate, such that the heating plate is coved between the second surface of the substrate and the conducting plate. A surface area of the conducting plate is smaller than a surface area of the substrate, and an end of the conducting plate extends out of the heating plate. The temperature sensing element is disposed on the end of the conducting plate which extends out of the heating plate to sense a temperature of the substrate through the conducting plate. The printing unit is movably disposed above the first surface of the substrate to form the 3D object formed in the layer-by-layer manner by dispensing the thermal-plastic material on the first surface of the substrate.

In an embodiment of the invention, the 3D printing apparatus further includes a control unit electrically connected with the heating platform and the printing unit. The printing unit is controlled by the control unit to form the 3D object on the first surface of the substrate. The heating platform is controlled by the control unit to heat the 3D object during the forming process of the 3D object.

In an embodiment of the invention, the control unit is electrically connected with the temperature sensing element and the heating plate to adjust a heating parameter of the heating plate according to a sensing result of the temperature sensing element.

In an embodiment of the invention, the heating plate is attached to the entire second surface of the substrate to heat the substrate.

In an embodiment of the invention, the substrate defines a primary region and a peripheral region adjacent to the primary region between the first surface and the second surface. The 3D object is formed on the primary region of the first surface, and an orthogonal projection of the conducting plate at least partially overlaps the primary region of the second surface.

In an embodiment of the invention, a temperature of the primary region is higher than a temperature of the peripheral region, and a temperature of the conducting plate is equal to the temperature of the primary region.

In an embodiment of the invention, a thickness of the conducting plate is less than a thickness of the substrate.

In an embodiment of the invention, the substrate includes a glass substrate, and the conducting plate includes a metallic plate.

Based on the above, in the heating platform and the 3D printing apparatus of the invention, the substrate is directly heated by the heating plate, the conducting plate having the smaller area is attached to the heating plate, and one end of the conducting plate extends out of the heating plate. Thereby, thermal energy used by the heating plate to heat the substrate can be transferred to the conducting plate. Thus, the temperature sensing element can sense the temperature of the substrate through the conducting plate, such that the heating plate adjusts the temperature of the substrate according to the sensing result of the temperature sensing element to prevent the 3D object from burnt due to the substrate being overheated. Moreover, the conducting plate having the smaller area is heated more easily than the substrate and can transfer the thermal energy of the heating plate to the outside so as to reduce temperature difference between each the regions of the substrate. Accordingly, the heating platform of the invention can have good heating effects, and thus, the 3D printing apparatus of the invention can have good printing effects.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
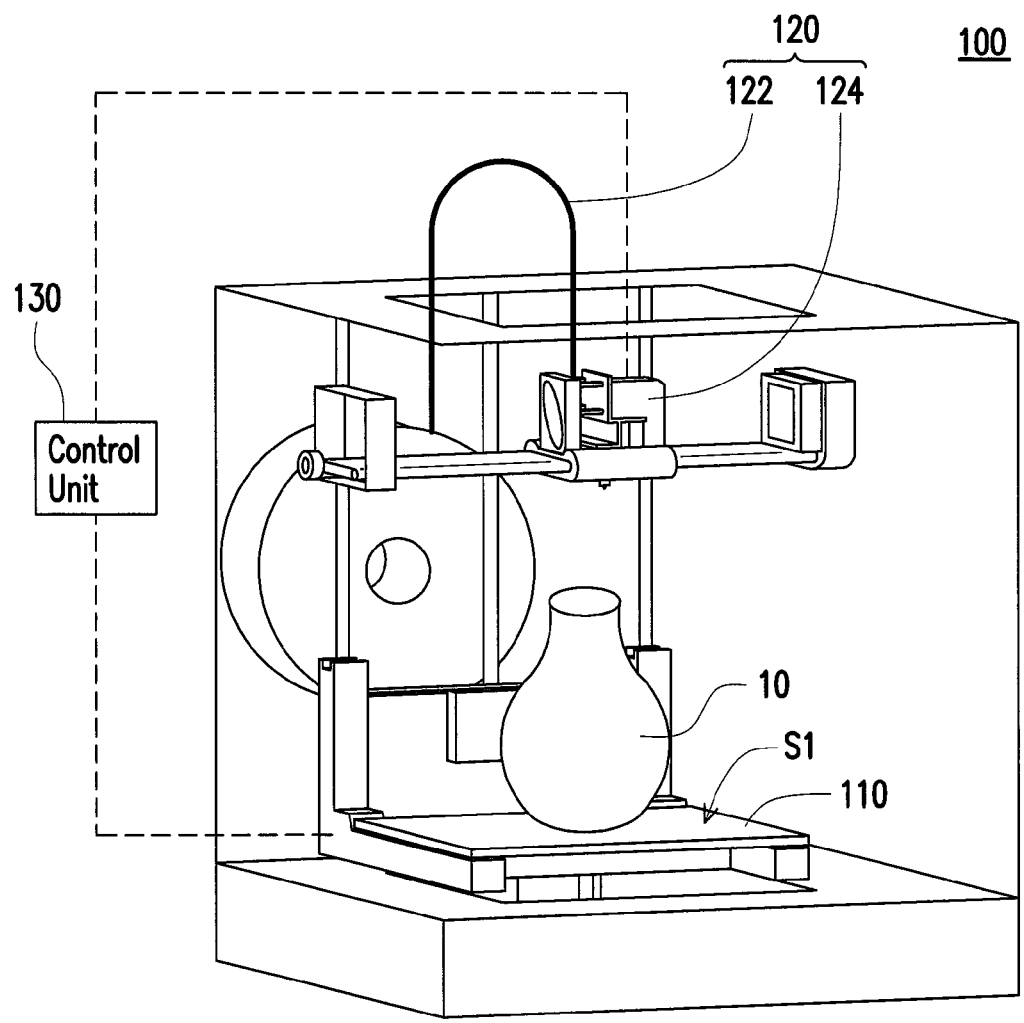
FIG. 1 is a schematic diagram of a three dimensional (3D) printing apparatus according to an embodiment of the invention.

It is to be understood that the foregoing and other detailed descriptions, features, and effects are intended to be described more comprehensively by providing embodiments accompanied with figures hereinafter. In the following embodiments, wording used to indicate directions, such as "up," "down," "front," "back," "left," and "right," merely refers to directions in the accompanying drawings. Therefore, the directional wording is used to illustrate rather than limit the invention. Moreover, the same or similar reference numerals represent the same or similar elements in the following embodiments.

FIG. 1 is a schematic diagram of a three dimensional (3D) printing apparatus according to an embodiment of the invention. With reference to FIG. 1, in the present embodiment, a 3D printing apparatus 100 includes a heating platform 110, a printing unit 120 and a control unit 130. The printing unit 120 is movably disposed above the heating platform 110. The control unit 130 is electrically connected with the heating platform 110 and the printing unit 120. The 3D printing apparatus 100 is adapted to print out a 3D object 10 formed in a layer-by-layer manner by dispensing a thermal-plastic material according to a digital 3D model. The digital 3D model may be a digital 3D image file established by means of computer-aided design (CAD) or animation modeling software, for instance. The control unit 130 may serve to read and process the digital 3D model.

Additionally, in the present embodiment, the heating platform 110 serves to carry the thermal-plastic material spray-coated by the printing unit 120. The printing unit 120 is disposed above the heating platform 110 and controlled by the control unit 130. The printing unit 120 includes at least one material supply spool 122 and a printing head 124. The material supply spool 122 is coupled to the printing head 124 to supply the thermal-plastic material to the printing head 124, while the printing head 124 is disposed above the heating platform 110 to dispense the thermal-plastic material in the layer-by-layer manner on the heating platform 110 to form a 3D object 10 on the heating platform 110. In the present embodiment, the material supply spool 122 may be a solid spool composed of the thermal-plastic material. The thermal-plastic material may be a thermo-plastic polymer material such as polylactic acid (PLA), acrylonitrile butadiene styrene (ABS) resin or the like. The solid spool serving as the material supply spool 122 may be heated using a heating unit (not shown) of the printing head 124. Thereby, the solid spool is in a melted state, squeezed from the printing head 124 and stacked from bottom to top on the heating platform 110 to form a plurality of thermal-plastic material layers, and the thermal-plastic material layers are stacked together to form the 3D object 10. It should be mentioned herein that generally, the thermal-plastic material dispensed in the layer-by-layer manner on the heating platform 110 by the printing head 124 may include a building material for building the 3D object 10 and a support material for supporting the 3D object 10. That is, the thermal-plastic material printed out and dispensed on the heating platform 110 does not merely serve to form the 3D object 10, but also form a support portion, a base (not shown) or the like for supporting the 3D object 10, and after curing the thermal-plastic material printed out and dispensed on the heating platform 110, the support material is removed so as to obtain the 3D object 10.

Additionally, in the present embodiment, during the process of the printing head 124 of the printing unit 120 stacking the thermal-plastic material in the layer-by-layer manner on the heating platform 110, the heating platform 110 of the 3D printing apparatus 100 is controlled by the control unit 130 to heat the 3D object 10 during the forming process of the 3D object 10. That is, the 3D printing apparatus 100 may control a temperature of the heating platform 110 by the control unit 130, such that the temperature of the heating platform 110 is higher than a temperature for curing the thermal-plastic material to prevent the thermal-plastic material from being cooled down and cured too soon before the 3D object 10 is not yet completed. After the 3D printing apparatus 100 completes printing, the heating platform 110 may also cure or dry the 3D object 10 thereon to initially form the 3D object 10.

Figure 2:
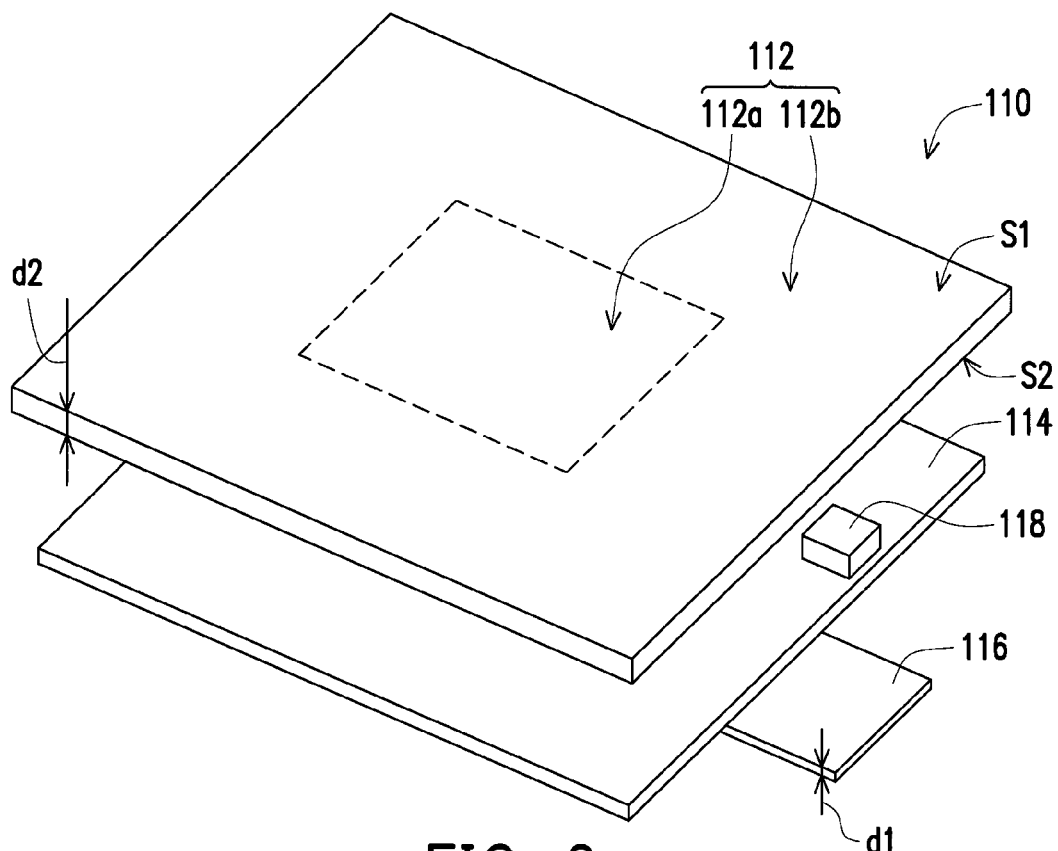
FIG. 2 is an exploded view of the heating platform depicted in FIG. 1.
Figure 3:
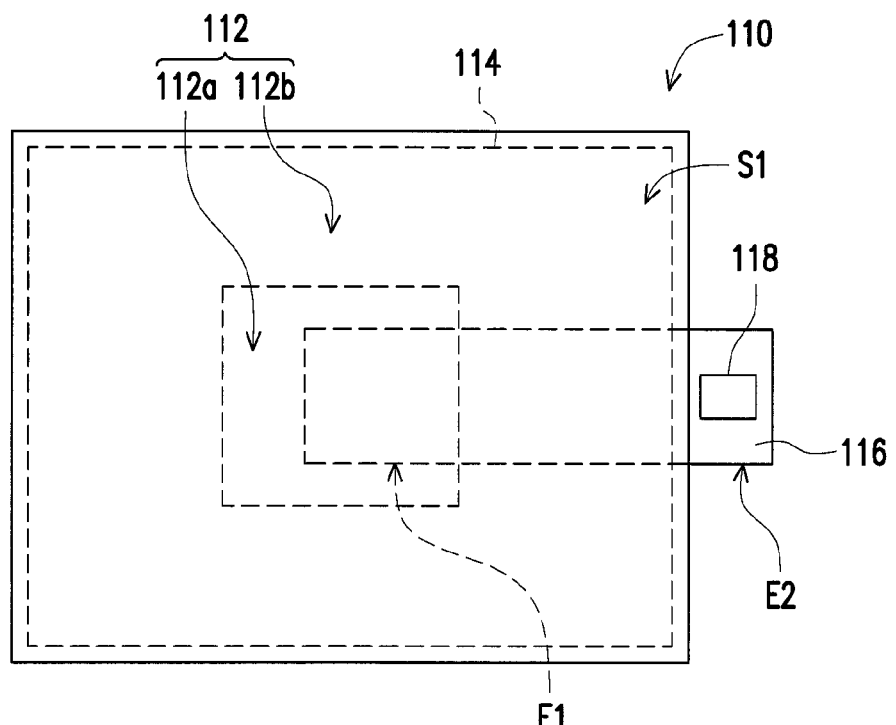
FIG. 3 is a schematic top view of the heating platform depicted in FIG. 2.

FIG. 2 is an exploded view of the heating platform depicted in FIG. 1. FIG. 3 is a schematic top view of the heating platform depicted in FIG. 2. With reference to FIG. 1 through FIG. 3, in the present embodiment, the heating platform 110 includes a substrate 112, a heating plate 114, a conducting plate 116 and a temperature sensing element 118. The substrate 112 has a first surface S1 and a second surface S2 which are opposite to each other. The first surface S1 serves to form 3D object 10. Thus, the printing unit 120 actually is formed above the first surface S1 of the substrate 112 to form the 3D object 10 formed by dispensing the thermal-plastic material in the layer-by-layer manner on the first surface S1 of the substrate 112. Additionally, the substrate 112 defines a primary region 112a and a peripheral region 112b adjacent to the primary region 112a between the first surface S1 and the second surface S2. The 3D object 10 is adapted to be formed on the primary region 112a on the first surface S1 of the substrate 112. In the present embodiment, the primary region 112a corresponds to a central portion of the substrate 112, and the peripheral region 112b surrounds the primary region 112a, but the invention is not intent to limit ranges, proportions and relative positions of the primary region 112a and the peripheral region 112b.

On the other hand, in the present embodiment, the heating plate 114 is attached to the second surface S2 of the substrate 112 to heat the substrate 112. The conducting plate 116 is attached to the heating plate 114, e.g., directly attached to on surface of the heating plate 114 that is opposite to the substrate 112, such that the heating plate 114 is located between the substrate 112 and the conducting plate 116. Due to the conducting plate 116 and the substrate 112 respectively being attached to two surfaces of the heating plate 114, thermal energy generated by the heating plate 114 may be transferred to the substrate 112 and the conducting plate 116. Moreover, an end of the conducting plate 116 further extends out of the heating plate 114. The temperature sensing element 118 is disposed on the end of the conducting plate 116 which extends out of the heating plate 114 so as to sense a temperature of the substrate 112 through the conducting plate 116. Furthermore, an orthogonal projection of the conducting plate 116 at least partially overlaps the primary region 112a on the second surface S2 of the substrate 112, and thus, the temperature sensed by the temperature sensing element 118 through the conducting plate 116 may be considered as a temperature of the primary region 112a. However, the invention is not limited to the aforementioned implementation.

It should be mentioned that although the heating platform 110 of the present embodiment is applied to the 3D printing apparatus 100, the heating platform 110 is actually adapted to heat an object to be heated, which is not shown, and the object to be heated is adapted to be disposed in the primary region 112a of the substrate 112. For example, when the heating platform 110 is applied to the 3D printing apparatus 100 (for example, in the present embodiment), the 3D object 10 is the object to be heated as referred to. Accordingly, the heating platform 110 of the present embodiment serves to heat the 3D object 10 during the forming process of the 3D object 10 with the heating plate 114 serving as a heating source, but the invention is not intent the application scope of the heating platform 110.

To be more specific, in the present embodiment, the substrate 112 is, for example, a glass substrate, but the invention is not limited thereto. In order to allow the heating platform 110 to have a larger heating region, the substrate 112 and the heating plate 114 are commonly manufactured as having larger areas. The substrate 112 provides the first surface S1 for forming the 3D object 10, and the heating plate 114 is directly adhered to the second surface S2 of the substrate 112 which opposite to the first surface S1. Preferably, the heating plate 114 is adhered to the entire second surface S2 of the substrate 112. Thereby, a vapor chamber commonly used in the conventional art may be omitted from being disposed between the substrate 112 and the heating plate 114, such that the heating plate 114 directly heats the primary region 112a and the peripheral region 112b of the substrate 112. Since the heating plate 114 is manufactured as having a larger area, temperature unevenness occurs in each portion of the heating plate 114. Thus, the temperature unevenness also occurs in each region on the substrate 112 heated by the heating plate 114. In the present embodiment, a temperature of the primary region 112a is higher than a temperature of the peripheral region 112b. Thus, during the process of heating the heating platform 110, the printing unit 120 is adapted to dispense the thermal-plastic material in the layer-by-layer manner in the primary region 112a of the substrate 112 to form the 3D object 10 in the primary region 112a of the substrate 112 and maintain the temperature of the 3D object 10.

On the other hand, in the present embodiment, the conducting plate 116 is, for example, a metallic plate, but the invention is not limited thereto. The conducting plate 116 is adhered to one surface of the heating plate 114 which is opposite to the substrate 112, and an end of the conducting plate 116 extends out of the heating plate 116. Thus, the conducting plate 116 may also be heated by the heating plate 114. The purpose of disposing the conducting plate 116 on the surface of the heating plate 114 opposite to the substrate 112 is because the temperature unevenness occurs in both the heating plate 114 and the substrate 112, and if the 3D object 10 is directly formed on the primary region 112a of the substrate 112, the central portion of the 3D object 10 is easily burnt due to the temperature of the primary region 112a of the heating platform 110 being excessively high, and the peripheral portion of the 3D object 10 adjacent to the peripheral region 112b of the heating platform 110 may be unexpectedly cured due to the peripheral region 112b being excessively low. Accordingly, by adhering the conducting plate 116 to the heating plate 114 and extending an end of the conducting plate 116 out of the heating plate 114, heat energy of the heating plate 114 may be rapidly transferred and dissipated to the outside through the conducting plate 116.

Furthermore, in the present embodiment, the orthogonal projection of the conducting plate 116 at least partially overlaps the primary region 112a on the second surface S2 of the substrate 112. To be more detailed, the conducting plate 116 has a first end E1 and a second end E2 which are opposite to each other. The conducting plate 116 is attached to a lower surface of the heating plate 114 with the first end E1, while the first end E1 corresponds to the primary region 112a, and the second end E2 extends out of the heating plate 114. Thus, the heat energy generated by the heating plate 114 to heat the primary region 112a of the substrate 112 may transferred to the outside through the conducting plate 116. Namely, in the present embodiment, the orthogonal projection of the conducting plate 116 at least overlaps the primary region 112a on the second surface S2 of the substrate 112, the conducting plate 116 extends out of the heating plate 114, and thus, the heat energy used by the heating plate 114 to heat the primary region 112a of the substrate 112 may be adaptively transferred to the outside through the conducting plate 116. Thus, the heat energy used by the heating plate 114 to heat the primary region 112a is transferred from the first end E1 of the conducting plate 116 to the second end E2 and dissipated to the outside. By doing so, with the design of the conducting plate 116, the temperature of the primary region 112a of the substrate 112 may be adaptively lowered down to reduce temperature difference between the primary region 112a and the peripheral region 112b, such that the temperatures of the substrate 112 are distributed more evenly.

Additionally, in the present embodiment, the area of the conducting plate 116 is smaller than the area of the substrate 112, and a thickness d1 of the conducting plate 116 is less than a thickness d2 of the substrate 112. In other words, the conducting plate 116 is heat more easily than the substrate 112. That is, the heat energy provided by the heating plate 114 is transferred more slowly on the substrate 112 and takes a longer transfer process on the substrate 112. As a result, due to the heat loss easily occurring on the substrate 112 during the transfer process, the temperature unevenness appears on the substrate 112. In contrary, the heat provided by the heating plate 114 is transferred faster on the conducting plate 116 and takes a shorter transfer process on the conducting plate 116. As a result, the temperature unevenness appears on the conducting plate 116 less. In other words, temperature difference between the first end E1 and the second end E2 of the conducting plate 116 is less, and thus, the temperature of the conducting plate 116 may be considered as being equal to the temperature of the primary region 112a of the substrate 112. In this case, the temperature of the primary region 112a of the substrate 112 is higher than the temperature of the peripheral region 112b, and thus, the temperature of the conducting plate 116 may be considered as being higher than the temperature of the peripheral region 112b. Moreover, in the present embodiment, the temperature sensing element 118 is disposed on the end of the conducting plate 116 which extends out of the heating plate 114 (i.e., the second end E2 of the conducting plate 116). Thus, the temperature of the conducting plate 116 sensed by the temperature sensing element 118 may be considered as the temperature of the primary region 112a and the temperature used by the heating plate 114 to heat the primary region 112a. In other words, the temperature sensing element 118 of the present embodiment may obtain the temperature of the primary region 112a of the substrate 112 by directly sensing the temperature of the conducting plate 116.

Furthermore, in the present embodiment, the control unit 130 (illustrated in FIG. 1) is further electrically connected with the temperature sensing element 118 and the heating plate 114, and thus, the control unit 130 is capable of controlling the overall temperature of the substrate 112 by adjust a heating parameter of the heating plate 114, such as a heating power of the heating plate 114, according to a sensing result (i.e., the temperature of the conducting plate 116) of the temperature sensing element 118. Accordingly, with the aforementioned implementation, the heating platform 110 of the 3D printing apparatus 100 of the present embodiment may adjust the heating parameter of the heating plate 114 adaptively according to the temperature of the primary region 112a, and thereby, the 3D object 10 may be prevented from being burnt due to the primary region 112a being overheated. Additionally, the temperature difference between the primary region 112a and the peripheral region 112b may be reduced by transferring the heat of the primary region 112a to the outside through the conducting plate 116a. Thus, even though the heating plate 114 adjusts the heating parameter according to the temperature of the primary region 112a, the temperature of the peripheral region 112b is not excessively low to cause the peripheral portion of the 3D object 10 to be unexpectedly cured.

To sum up, in the heating platform and the 3D printing apparatus of the invention, the substrate is directly heated by the heating plate, the conducting plate having the smaller area is attached to the heating plate, and one end of the conducting plate extends out of the heating plate. Additionally, the heat used by the heating plate to heat the substrate can be transferred to the conducting plate. Thus, temperature sensing element can sense the temperature of the substrate through the conducting plate, such that the heating plate adjust the temperature of the substrate according to the sensing result of the temperature sensing element to prevent the 3D object from being burnt due to the primary region being overheated. Moreover, the conducting plate having the smaller area is heated more easily than the substrate and can transfer the heat of the heating plate corresponding to the primary region to the outside, such that the temperature difference between the primary region and the peripheral region on the substrate can be reduced. Thus, even if the heating plate adjusts the heating parameter according to the temperature of the primary region, the peripheral region is not excessively cooled down to the 3D object to be unexpectedly cured. Accordingly, the heating platform of the invention can have good heating effects, such that the 3D printing apparatus of the invention has good printing effects.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A heating platform, adapted to form a three dimensional (3D) object in a layer-by-layer manner by dispensing a thermal-plastic material, the heating platform comprising:
    a substrate, having a first surface and a second surface which are opposite to each other, wherein the first surface is used to form the 3D object;
    a heating plate, attached to the second surface of the substrate to heat the substrate;
    a conducting plate, attached to the heating plate to make the heating plate to be disposed between the second surface of the substrate and the conducting plate, wherein a surface area of the conducting plate is smaller than a surface area of the substrate, and an end of the conducting plate extends out of the heating plate; and
    a temperature sensing element, disposed on the end of the conducting plate which extends out of the heating plate to sense a temperature of the substrate through the conducting plate.

2. The heating platform according to claim 1, wherein the heating plate is attached to the entire second surface of the substrate to heat the substrate.

3. The heating platform according to claim 1, wherein the substrate defines a primary region and a peripheral region adjacent to the primary region between the first surface and the second surface, the 3D object is formed on the primary region of the first surface, and an orthogonal projection of the conducting plate at least partially overlaps the primary region of the second surface.

4. The heating platform according to claim 3, wherein a temperature of the primary region is higher than a temperature of the peripheral region, and a temperature of the conducting plate is equal to the temperature of the primary region.

5. The heating platform according to claim 1, wherein a thickness of the conducting plate is less than a thickness of the substrate.

6. The heating platform according to claim 1, wherein the substrate comprises a glass substrate, and the conducting plate comprises a metallic plate.

7. A three dimensional (3D) printing apparatus, adapted to form a 3D object in a layer-by-layer manner by dispensing a themal-plastic material, the 3D printing apparatus comprising:
   a heating platform, comprising:
      a substrate, having a first surface and a second surface which are opposite to each other, wherein the first surface is used to form the 3D object;
      a heating plate, attached to the second surface of the substrate to heat the substrate;
      a conducting plate, attached to the heating plate to make the heating plate to be disposed between the second surface of the substrate and the conducting plate, wherein a surface area of the conducting plate is smaller than a surface area of the substrate, and an end of the conducting plate extends out of the heating plate; and
      a temperature sensing element, disposed on the end of the conducting plate which extends out of the heating plate to sense a temperature of the substrate through the conducting plate; and
   a printing unit, movably disposed above the first surface of the substrate to form the 3D object formed in the layer-by-layer manner by dispensing the thermal-plastic material on the first surface of the substrate.

8. The 3D printing apparatus according to claim 7, further comprising:
   a control unit, electrically connected with the heating platform and the printing unit, wherein the printing unit is controlled by the control unit to form the 3D object on the first surface of the substrate, and the heating platform is controlled by the control unit to heat the 3D object during the forming process of the 3D object.

9. The 3D printing apparatus according to claim 8, wherein the control unit is electrically connected with the temperature sensing element and the heating plate to adjust a heating parameter of the heating plate according to a sensing result of the temperature sensing element.

10. The 3D printing apparatus according to claim 7, wherein the heating plate is attached to the entire second surface of the substrate to heat the substrate.

11. The 3D printing apparatus according to claim 7, wherein the substrate defines a primary region and a peripheral region adjacent to the primary region between the first surface and the second surface, the 3D object is formed on the primary region of the first surface, and an orthogonal projection of the conducting plate at least partially overlaps the primary region of the second surface.

12. The 3D printing apparatus according to claim 11, wherein a temperature of the primary region is higher than a temperature of the peripheral region, and a temperature of the conducting plate is equal to the temperature of the primary region.

13. The 3D printing apparatus according to claim 7, wherein a thickness of the conducting plate is less than a thickness of the substrate.

14. The 3D printing apparatus according to claim 7, wherein the substrate comprises a glass substrate, and the conducting plate comprises a metallic plate.

* * * * *